United States Patent [19]

Dunleavy et al.

[11] Patent Number: 5,038,864
[45] Date of Patent: Aug. 13, 1991

[54] PROCESS FOR RESTORING THE PERMEABILITY OF A SUBTERRANEAN FORMATION

[75] Inventors: Michael F. Dunleavy, Cody; Andrew A. Franklin, Powell; Daniel D. Wood, Cody, all of Wyo.

[73] Assignee: Marathon Oil Company, Finlay, Ohio

[21] Appl. No.: 521,795

[22] Filed: May 10, 1990

[51] Int. Cl.$^5$ .............................................. E21B 37/00
[52] U.S. Cl. ............................. 166/300; 166/305.1; 166/312; 252/8.552
[58] Field of Search ............... 166/263, 270, 273, 274, 166/275, 300, 304, 305.1, 312; 252/8.552, 8.554

[56] References Cited

U.S. PATENT DOCUMENTS

| | | | |
|---|---|---|---|
| 2,221,353 | 11/1940 | Limerick et al. | 252/8.552 |
| 3,131,759 | 5/1964 | Slusser et al. | 166/305.1 |
| 3,757,861 | 9/1973 | Routson | 166/273 |
| 3,970,148 | 7/1976 | Jones et al. | 166/307 |
| 4,090,562 | 5/1978 | Maly et al. | 166/304 |
| 4,278,129 | 7/1981 | Walton | 166/263 |
| 4,440,651 | 4/1984 | Weisrock | 252/8.554 |
| 4,464,268 | 8/1984 | Schievelbein | 252/8.552 |
| 4,541,483 | 9/1985 | Walton | 166/263 |
| 4,572,292 | 2/1986 | Stapp | 166/274 |
| 4,591,443 | 5/1986 | Brown et al. | 210/747 |
| 4,609,475 | 9/1986 | Hanlon et al. | 252/8.552 |
| 4,696,752 | 9/1987 | Lysandrou | 252/8.552 X |
| 4,813,482 | 3/1989 | Walton | 166/267 |
| 4,867,238 | 9/1989 | Bayless et al. | 166/261 |
| 4,886,609 | 12/1989 | Walton | 252/8.552 |
| 4,934,457 | 6/1990 | Wallender | 166/304 |

Primary Examiner—George A. Suchfield
Attorney, Agent, or Firm—Jack L. Hummel; Jack E. Ebel

[57] ABSTRACT

A process for restoring the injectivity of a well penetrating and in fluid communication with a subterranean formation wherein an aqueous treating solution comprising a mixture of an aqueous solution having no more than 30 weight percent of hydrogen peroxide dissolved therein and a mutual solvent is injected via the well to contact polymer accumulation so as to degrade and disperse same. The mutual solvent comprises alcohol, aromatic hydrocarbon, and an alkyl or alkylaryl polyoxyalkylene phosphate ester surfactant.

16 Claims, No Drawings

PROCESS FOR RESTORING THE PERMEABILITY OF A SUBTERRANEAN FORMATION

BACKGROUND OF THE INVENTION

The present invention relates to a process for increasing the permeability of a subterranean formation which is at least partially plugged with a polymer accumulation thereby restoring the injectivity of a well penetrating the subterranean formation, and more particularly, to such a process wherein the polymer accumulation is present in the well bore, at the well bore face and/or in the near well bore environment of the subterranean formation and an aqueous treating fluid comprising hydrogen peroxide and a mutual solvent is injected via the well and into the near well bore environment to contact, degrade and disperse the polymer accumulation.

Hydrocarbons are conventionally produced from a subterranean hydrocarbon-bearing formation to the surface via a well penetrating and in fluid communication with the formation. Usually a plurality of wells are drilled into fluid communication with a subterranean hydrocarbon-bearing formation to effectively produce hydrocarbons from a particular subterranean reservoir. Approximately 20 to 30% of the volume of hydrocarbons originally present within a given reservoir in a subterranean formation can be produced by the natural pressure of the formation, i.e., by primary production. Thereafter, additional quantities of hydrocarbons can be produced from most subterranean formations by means of secondary recovery processes, such as water flooding and steam flooding. To accomplish secondary recovery of hydrocarbons present in a subterranean formation, one or more wells are converted to or are drilled as injection wells. A drive fluid, such as water or steam, is injected into the subterranean formation via the injection wells to drive hydrocarbons present in the formation to one or more wells which are designated as production wells. Hydrocarbons are produced to the surface from the designated production wells by conventional production equipment and practices. A successful secondary recovery process may result in the recovery of about 30 to 50% of the original hydrocarbons in place in a subterranean formation.

Tertiary recovery processes have been developed to produce additional quantities of hydrocarbons from subterranean hydrocarbon-bearing formations. Such tertiary recovery processes include the addition of a surfactant and/or a polymer to a drive fluid, such as water. A surfactant reduces the interfacial tension between formation hydrocarbons and reservoir rock, whereas a polymer, such as a polyacrylamide or a polysaccharide, increases the viscosity of the drive fluid to substantially reduce fingering or channeling of the drive fluid through the formation so as to produce a more uniform injection profile which results in increased hydrocarbon recovery.

Polymers used in secondary or tertiary recovery processes often accumulate in the well bore, at the well bore face, and/or in the near well bore environment of a subterranean formation surrounding an injection well over the period of time during which injection of a drive fluid containing a polymer occurs. Where a brine which is produced from a subterranean formation is used to formulate the drive fluid, that portion of hydrocarbon which is not removed from the brine by conventional surface treatment, i.e., hydrocarbon carryover, and the total dissolved solids content of the brine can be filtered out of the injected brine by the accumulated polymer in the well bore, at the well bore face and/or in the near well bore environment surrounding the injection well. Scales, such as calcium carbonate and iron carbonate, as well as naturally occurring algae and formation fines can also be incorporated in the accumulated polymer at the well bore face and/or in the near well bore environment surrounding an injection well. The resultant accumulation of polymer at the well bore face and/or in the near-injection well bore environment may be interbedded with scale, hydrocarbons, crude oil, algae, and/or miscellaneous formation fines. This accumulated polymer can reduce the permeability of a subterranean formation significantly reducing the injectivity of a drive fluid into a subterranean formation via an injection well, and accordingly, significantly reducing the volume of hydrocarbon produced by a secondary or tertiary recovery process. It is suspected that crosslinking of injected polymer by ions, such as $Ca^{++}$ and $Mg^{++}$, present in injection water, well tubulars, and formation rock, results in polymer accumulation. Large accumulations of polymer are visually detectable as a gel-like material in backflowed fluids from injection wells. Smaller accumulations of polymer, which may be invisible to the eye, also excessively reduce permeability in the rock matrix near the well bore. The accumulation of a discrete number of extremely high molecular weight polymer molecules can substantially plug small pores in the formation and greatly reduce permeability therein. The period of time before loss of drive fluid injectivity due to polymer accumulation in the well bore, at the well bore face, and/or in the near well bore environment surrounding an injection well occurs is dependent upon formation porosity, ionic characteristics of the formation, the molecular weight of and concentration of the polymer in a drive fluid, and the velocity of the injection rate of a drive fluid. Significant loss of injectivity, e.g., 25% to 75%, may occur within one year after commencing injection of a drive fluid into a subterranean formation.

In order to restore the permeability of a subterranean formation surrounding an injection well which has been reduced by polymer accumulation in the near well bore environment, a heated aqueous solution having an acid, such as hydrochloric acid, chlorine dioxide or equivalent acids, dissolved therein has been injected via the injection well and into the formation to dissolve and disperse the polymer accumulation. However, such treatments are relatively expensive and are corrosive to surface and well bore tubulars. Accordingly, a need exists for a process for restoring the injectivity of an injection well in fluid communication with a subterranean formation, the permeability of the near injection well bore environment being reduced by polymer accumulation, which is relatively inexpensive and effective.

Accordingly, it is an object of the present invention to provide a process for restoring the injectivity of a well penetrating a subterranean formation and having a polymer accumulation in the well bore, at the well bore face, and/or in near injection well bore portion of the subterranean formation by effectively increasing the permeability of a subterranean formation.

It is another object of the present invention to provide such a process for restoring the injectivity of a well in fluid communication with a subterranean formation which is relatively inexpensive.

SUMMARY OF THE INVENTION

The present invention provides a process for restoring the injectivity of a well penetrating and in fluid communication with a subterranean hydrocarbon-bearing formation and having a polymer accumulation in the well bore, at the well bore face, and/or in the near well bore environment of the subterranean formation. An aqueous treating fluid comprising an aqueous solution having from about 5 to about 30 weight percent of an inorganic peroxide dissolved therein and a mutual solvent which are mixed in a volumetric ratio of from about 2 to 1 to about 9 to 1 is injected via the well into contact with the accumulation of polymer. The mutual solvent comprises alcohol, aromatic hydrocarbon and alkyl or alkylaryl polyoxyalkylene phosphate ester surfactant. The aqueous treating fluid degrades and disperses the accumulation of polymer to substantially restore the injectivity of the well.

DETAILED DESCRIPTION OF THE PREFERRED EMBODIMENTS

In accordance with the present invention, a process is provided for effectively restoring the injectivity of a well in fluid communication with a subterranean hydrocarbon-bearing formation having accumulated polymer at the well bore face and/or in the near well bore environment which reduces the permeability of the formation. One measurement of fluid injectivity is the ratio of barrels of fluid injected per day divided by the injection pressure, as well be evident to a skilled artisan. The process of the present invention comprises injecting into the formation via the well an aqueous treating solution containing an inorganic peroxide and a mutual solvent comprising alcohol, aromatic hydrocarbon, and an alkyl or alkylaryl polyoxyalkylene phosphate ester surfactant so as to contact the accumulated polymer. The well is shut in for a period of time sufficient to allow the aqueous treating solution to attack, degrade, disperse, dissolve and/or suspend the polymer accumulation. Thereafter, a drive fluid is injected into the formation via the well bore to displace the aqueous treating solution and the polymer accumulation toward one or more producing wells in fluid communication with the formation for production to the surface.

The process of the present invention may be applied to restore the fluid injectivity of any well through which a fluid containing a relatively high molecular weight polymer has been injected into a subterranean hydrocarbon-bearing formation. While such well is usually an injection well utilized in a secondary or tertiary recovery process, the process of the present invention may be applied to restore the fluid injectivity of a production well utilized in a secondary or tertiary recovery process where such well is plugged by a relatively high molecular weight polymer deposited at or near the production well bore or where the subterranean formation surrounding the production well bore has been treated with a relatively high molecular weight polymer to improve vertical conformance. The polymer can be a synthetic polymer, such as polyacrylamide, a partially hydrolyzed polyacrylamide, or an alkoxylated polyacrylamide, an organic polymer, such as a homopolysaccharide or a heteropolysaccharide, or mixtures of organic and synthetic polymers. The polymer preferably has a relatively high molecular weight of from about 500,000 to about 15,000,000 or more. As will be evident to the skilled artisan, other additives are often incorporated into a drive fluid utilized in a secondary or tertiary hydrocarbon-recovery process, such as surfactants and/or gas, e.g., carbon dioxide or nitrogen.

Hydrogen peroxide is the preferred inorganic peroxide suitable for use in the aqueous treating solution of the present invention and is commercially available in aqueous solutions containing a specified weight percent of hydrogen peroxide. Preferably, the aqueous solution contains no more than about 30 weight percent hydrogen peroxide, more preferably about 5 to about 30 weight percent hydrogen peroxide, and most preferably about 10 to about 15 weight percent hydrogen peroxide.

As utilized through this specification, the alkyl or alkylaryl polyoxyalkylene phosphate ester surfactant of the mutual solvent utilized in the aqueous treating solution of the present invention has the formulas:

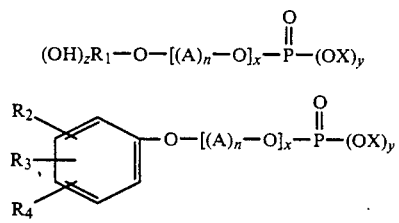

wherein $R_1$ represents an alkyl radical having 10 to 18 carbon atoms, $R_2$ represents an alkyl radical of about 5 to about 27 carbon atoms or cycloalkyl radical and radicals derived from mineral oils containing alkyl, cycloalkyl and mixed alkylcycloalkyl radicals having from about 12 to 27 carbon atoms, $R_3$ and $R_4$ represent either hydrogen or alkyl of from about 1 to 22 carbon atoms and the higher alkyls defined by $R_1$ and cycloalkyls defined by $R_2$ or radicals derived from minerals oils; A represents the residue of ethylene oxide, ethylene oxide and tetrahydrofuran, or mixed lower alkylene oxides selected from the group consisting of ethylene oxide, propylene oxide, and butylene oxide, alone or including tetrahydrofuran, wherein the total molecular weight of said ester is about 500 to about 1500, and wherein A can be heteric or block in molecular configuration; n represents the degree of oxyalkylation; x and y are 1 or 2, the sum of x and y is 3 and z is an integer of 0 to 5; X is hydrogen or a monovalent cation selected from at least one of the group consisting of an alkali metal, alkyl amine and ammonium. As also utilized throughout this specification, "alkylaryl" denotes an alkylated aryl and is synonymous with the term "aralkyl". These alkyl or alkylaryl polyoxyalkylene surfactants, as well as phosphorus acid reactants and polyhydroxy oxyalkylene compounds which are reacted to form these surfactants, are more fully described in U.S. Pat. No. 4,541,483, the disclosure of which is incorporated herein by reference.

Alcohols used in formulating the mutual solvent are selected from aliphatic alcohols, glycols, polyglycols, glycol ethers, and mixtures thereof. Aromatic hydrocarbons include benzene, toluene, xylene, and the like. As will be evident to the skilled artisan, the mutual solvent utilized in the aqueous treating solution employed in the process of the present invention may contain minor amounts of water which are present in the industrial grade of alcohols and aromatic hydrocarbons used in formulating the mutual solvent. The mutual solvent contains about 5 to about 50 weight percent, preferably about 10 to about 20 weight percent and most preferably about 12 to about 18 weight percent of an alkyl or alkylaryl polyoxyalkylene phosphate ester surfactant dissolved in alcohol(s) and aromatic hydrocarbon(s). Preferably, the phosphate ester surfactant is dissolved in a mixed non-aqueous solvent including methanol, isopropanol, capryl alcohol and xylene. Methanol is preferably present in the non-aqueous solvent in an amount of from about 20 to about 27 weight percent, isopropanol is preferably present in an amount of from about 40 to about 44 weight percent, capryl alcohol is preferably present in an amount of from about 8 to about 12 weight percent and xylene is present in an amount of from about 23 to about 27 weight percent.

In accordance with the present invention, a volume of an aqueous solution having no more than 30 weight percent of hydrogen peroxide dissolved therein is mixed, preferably at the surface of the well to be treated in a manner evident to the skilled artisan, with a volume of mutual solvent to form an aqueous treating solution. The ratio of the volume of aqueous solution containing hydrogen peroxide to mutual solvent will vary depending upon the degree to which a produced brine which is incorporated into a drive fluid adds total dissolved solids and hydrocarbon carryover to accumulated polymer in the near well bore environment. The ratio of aqueous solution of hydrogen peroxide to mutual solvent is preferably about 9 to 1 to about 2 to 1, more preferably about 5 to 1.

The resultant aqueous treating solution is injected into a subterranean formation via a well whose injectivity is reduced due to a polymer accumulation in the well bore, at the well bore face and/or in the subterranean formation. The volume of aqueous treating solution injected is dependent on the size of the zone to be treated. Generally a sufficient volume of aqueous treating solution is injected to contact substantially all of the accumulated polymer occupying the treatment zone, which is a function of the volume of the well bore itself, the pore volume and oil saturation of the surrounding formation rock, the void volume of any fracture network, the amount of polymer previously injected and the specific chemical characteristics of the polymer and well bore environment. As a general guide, the volume can range from about 1 gallon per foot of the depth of formation to be treated up to the economic limit as dictated by the total cost of the aqueous treating solution. Preferably, the volume is from about 5 to about 7 gallons of aqueous treating solution per foot of formation interval to be treated. The aqueous treating solution may be displaced into contact with the polymer accumulation by injecting a volume of water, brine, or mixtures thereof which is substantially free of polymer and which is calculated to effect such displacement, as will be evident to the skilled artisan. The well is then shut in for a period of time, e.g., 12 to 24 hours, sufficient to permit the aqueous treating solution to remain in contact with the polymer accumulation. It is believed the inorganic peroxide present in the aqueous treating solution functions to attack, degrade and disperse the relatively high molecular weight synthetic and/or organic polymer in the polymer accumulation. Thereafter, a drive fluid, such as an aqueous polymer solution, is injected via the well into the subterranean formation to effect the recovery of hydrocarbons from the formation via another well in fluid communication with the formation. Alternatively, where the process of the present invention is applied to a production well bore, the aqueous treating solution and dispersed accumulated polymer is preferably backflowed out of the production well bore prior to placing the production well back in service. Treatment of an injection or production well bore in accordance with the process of the present invention may involve two or more sequential injections of the aqueous treating solution. When it is desired to place an injection well back in service immediately after treatment in accordance with the process of the present invention, a water or brine spacer is preferably injected between the aqueous treatment fluid and the subsequently injected drive fluid to prevent diffusion mixing of the peroxide and any subsequently injected polymer.

It is believed that hydrogen peroxide reduces the molecular weight of the polymer, breaking it into smaller units, without significantly changing the chemical composition and attributes of the functional groups on the polymer. Although the degraded polymer is substantially the same species as the originally injected high molecular weight polymer, because of its lower molecular weight, the degraded polymer is physically too small to accumulate and form a stable accumulation in the well bore or plug the formation pores. Thus the lower molecular weight polymer has little permeability reducing effect. It is further believed that the mutual solvent functions to dissolve hydrocarbons present in the polymer accumulation.

As utilized throughout this specification, the term "near well bore environment" denotes the area of a subterranean formation, including both the rock matrix and fracture network, surrounding a well bore penetrating same which, as a general guide, extends a radial distance into the formation of up to about 3.1 meters from the well bore. Further, as utilized throughout this specification, "polymer accumulation", "accumulation of polymer" or "accumulated polymer" is utilized interchangeably to denote a relatively high molecular weight synthetic polymer, a relatively high molecular weight organic polymer or mixtures thereof present in a well bore, at the well bore face, or in a portion of a subterranean formation in a quantity sufficient to reduce the permeability of at least the portion of the subterranean formation so as to reduce the injectivity of fluid into the subterranean formation via a well penetrating same. The polymer accumulation may contain scale, hydrocarbons, crude oil, algae, miscellaneous formation fines, or mixtures thereof.

The following examples demonstrate the practice and utility of the present invention, but are not to be construed as limiting the scope thereof.

EXAMPLE 1

A well in Wyoming has a pre-polymer injectivity rate of about 325 barrels of water injected per day (BWIPD) at a pressure of about 420 psi. An aqueous solution containing 0.035% of a polyacrylamide having a molecular weight of about 15,000,000 is injected into a subterranean formation via this well. After 18 months, the injection pressure is reduced to about 165 BWIPD at about 490 psi due to accumulation of polymer in the near well bore environment. An aqueous solution having about 10 weight percent hydrogen peroxide dissolved therein is mixed with TC-102-MS, a mutual solvent containing an alkyl or alkylaryl polyoxyalkylene phosphate ester surfactant, methanol, isopropanol, capryl alcohol and xylene and manufactured by Techno- Chem, Inc. in 1989, in a volume ratio of about 5 to 1. Approximately 660 gallons of the resultant aqueous treating solution are injected into a 100 foot interval of Phosphoria formation. The well is shut in for a period of 16 to 18 hours. Thereafter, injection of the aqueous polymer containing drive fluid is commenced at an injectivity rate of 340 BWIPD at 460 psi.

EXAMPLE 2

A well in Wyoming has a pre-polymer injectivity rate of about 1600 barrels of water injected per day (BWIPD) at a pressure of about 100 psi. An aqueous solution containing 0.035% of a polyacrylamide having a molecular weight of about 15,000,000 is injected into the subterranean formation via this well. After 20 months, the injection pressure is reduced to about 1040 BWIPD at about 220 psi due to accumulation of polymer in the near well bore environment. An aqueous solution having about 10 weight percent hydrogen peroxide dissolved therein is mixed with TC-102-MS, a mutual solvent containing an alkyl or alkylaryl polyoxyalkylene phosphate ester surfactant, methanol, isopropanol, capryl alcohol and xylene and manufactured by Techno-Chem, Inc. in 1989, in a volume ratio of about 5 to 1. Approximately 660 gallons of the resultant aqueous treating solution are injected into a 125 foot interval of Tensleep formation. The well is shut in for a period of 16 to 18 hours. Thereafter, injection of the aqueous polymer containing drive fluid is commenced at an injectivity rate of 1980 BWIPD at 190 psi.

EXAMPLE 3

A well in Wyoming has a pre-polymer injectivity rate of about 500 barrels of water injected per day (BWIPD) at a pressure of about 400 psi. An aqueous solution containing 0.035% of a polyacrylamide having a molecular weight of 15,000,000 is injected into the subterranean formation via this well.. After 16 months, the injection pressure is reduced to about 205 BWIPD at about 515 psi due to accumulation of polymer in the near well bore environment. An aqueous solution having about 10 weight percent hydrogen peroxide dissolved therein is mixed with TC-102-MS, a mutual solvent containing an alkyl or alkylaryl polyoxyalkylene phosphate ester surfactant, methanol, isopropanol, capryl alcohol and xylene and manufactured by Techno-Chem, Inc. in 1989, in a volume ratio of about 5 to 1. Approximately 660 gallons of the resultant aqueous treating solution are injected into a 100 foot interval of Phosphoria formation. The well is shut in for a period of 16 to 18 hours. Thereafter, injection of the aqueous polymer containing drive fluid is commenced at an injectivity rate of 577 BWIPD at 490 psi.

As indicated by the results of Examples 1-3, the process of the present invention restores the injectivity of a well substantially to the injectivity which the well exhibited when injection of an aqueous solution containing a relatively high molecular weight polymer began.

While the foregoing preferred embodiments of the invention has been described and shown, it is understood that the alternatives and modifications, such as those suggested and others, may be made thereto and fall within the scope of the invention.

We claim:

1. A process for restoring the injectivity of a well penetrating a subterranean formation and defining a well bore and a well bore face, the injectivity of the well being reduced by an accumulation of polymer in the well bore, at the well bore face and/or in the subterranean formation, the process comprising:
   injecting an aqueous treating solution into the well penetrating the subterranean formation, said aqueous treating solution comprising an aqueous solution having from about 5 to about 30 weight percent of an inorganic peroxide dissolved therein and a mutual solvent comprising alcohol, aromatic hydrocarbon, and alkyl or alkylaryl polyoxyalkylene phosphate ester surfactant, said aqueous solution and said mutual solvent being mixed in a volumetric ratio of from about 2 to 1 to about 9 to 1; and
   contacting the accumulation of polymer with said aqueous treating solution so as to degrade and disperse the accumulation of polymer to substantially restore the injectivity of the well.

2. The process of claim 1 further comprising:
   shutting in said well for a period of time sufficient to allow said aqueous treating solution to degrade and disperse the accumulation of polymer thereby substantially restoring the injectivity of a well.

3. The process of claim 2 wherein said well is shut in for a period of about 12 to about 24 hours.

4. The process of claim 1 wherein said alkyl or alkylaryl polyoxyalkylene phosphate ester surfactant is present in said mutual solvent in an amount from about 5 to about 50 weight percent of said mutual solvent.

5. The process of claim 4 wherein said alkyl or alkylaryl polyoxyalkylene phosphate ester surfactant is present in said mutual solvent in an amount from about 10 to about 20 weight percent of said mutual solvent.

6. The process of claim 5 wherein said alkyl or alkylaryl polyoxyalkylene phosphate ester surfactant is present in said mutual solvent in an amount from about 12 to about 18 weight percent of said mutual solvent.

7. The process of claim 1 wherein said mutual solvent comprises an alkyl or alkylaryl polyoxyalkylene phosphate ester surfactant dissolved in a mixed non-aqueous solvent comprising methanol in an amount from about 20 to about 27 weight percent, isopropanol in an amount of from about 40 to about 44 weight percent, capryl alcohol in an amount of from about 8 to about 12 weight percent, and xylene in an amount of from about 23 to about 27 weight percent.

8. The process of claim 7 wherein said aqueous solution and said mutual solvent are mixed in a volumetric ratio of about 5 to 1.

9. The process of claim 1 wherein said aqueous solution and said mutual solvent are mixed in a volumetric ratio of about 5 to 1.

10. The process of claim 1 wherein the accumulation of polymer is at the face of the well bore.

11. The process of claim 1 wherein the accumulation of polymer is in the near well bore environment of the formation.

12. The process of claim 1 further comprising:
    injecting a volume of water, brine, or mixtures thereof to displace said aqueous treating solution into contact with the accumulation of polymer.

13. The process of claim 12 wherein the accumulation of polymer is in the near well bore environment of the formation.

14. The process of claim 1 wherein said accumulation of polymer is an accumulation of synthetic polymer.

15. The process of claim 14 wherein said synthetic polymer is a polyacrylamide.

16. The process of claim 1 wherein the injectivity of the well is restored to substantially the injectivity of the well prior to being reduced by the accumulation of polymer.

* * * * *